United States Patent
Baum

[11] Patent Number: 5,263,671
[45] Date of Patent: Nov. 23, 1993

[54] HOLDER FOR ELONGATE ARTICLES

[75] Inventor: Heinz O. Baum, Giessen-Allendorf, Fed. Rep. of Germany

[73] Assignee: Emhart Inc., Newark, Del.

[21] Appl. No.: 895,497

[22] Filed: Jun. 8, 1992

[30] Foreign Application Priority Data

Jun. 11, 1991 [DE] Fed. Rep. of Germany ... 9107185[U]

[51] Int. Cl.⁵ .............................. F16L 3/22
[52] U.S. Cl. .................... 248/68.1; 24/543; 248/74.3
[58] Field of Search ........ 248/68.1, 69, 67.5, 248/74.1, 74.2, 74.3; 24/543

[56] References Cited

U.S. PATENT DOCUMENTS

| | | | |
|---|---|---|---|
| 1,313,113 | 8/1919 | Pleister | 248/903 X |
| 3,954,238 | 5/1976 | Nivet | 248/68.1 |
| 4,564,163 | 1/1986 | Barnett | 248/74.3 X |
| 4,609,171 | 9/1986 | Matsui | 248/68.1 X |
| 4,669,156 | 6/1987 | Guido et al. | 248/74.3 X |

Primary Examiner—Ramon O. Ramirez
Attorney, Agent, or Firm—Spencer T. Smith

[57] ABSTRACT

Holder for elongate articles, in particular for Bowden cables on a bicycle, which can be placed onto a T-bolt which projects relative to a component and on which it is secured both axially and radially against escape by means of an escape preventing means, and which has at least one elongate recess for receiving an article, in which the holder has a flap which is articulated longitudinally laterally and, for holding the article by means of the recess and the escape preventing means is pivoted and is held on the holder by means of a releasably catching mechanism. The holder is preferably formed from plastics material in one piece with the flap, and the flap is articulated by means of a film hinge.

9 Claims, 5 Drawing Sheets

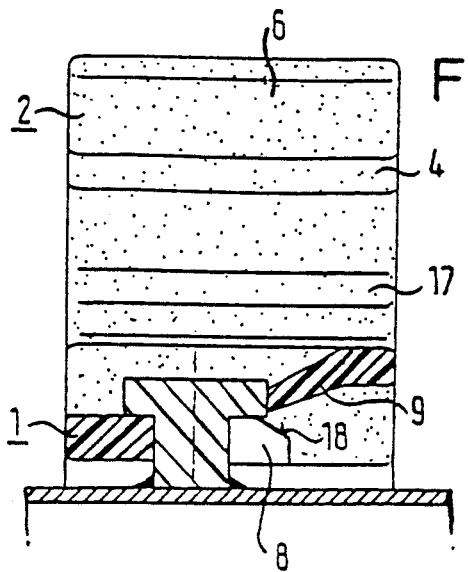
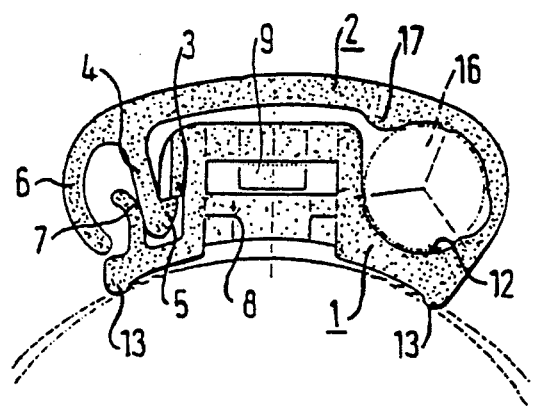
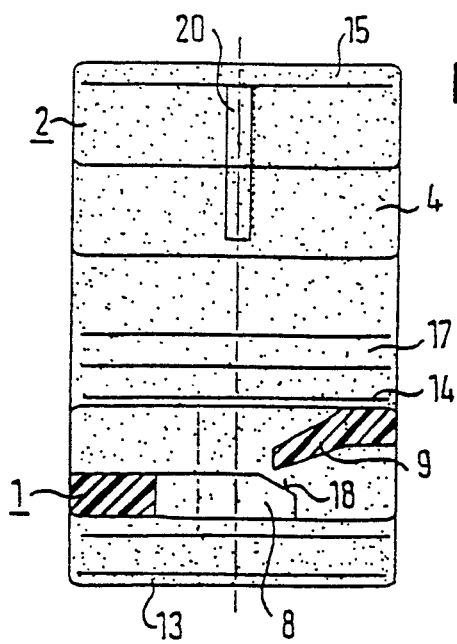
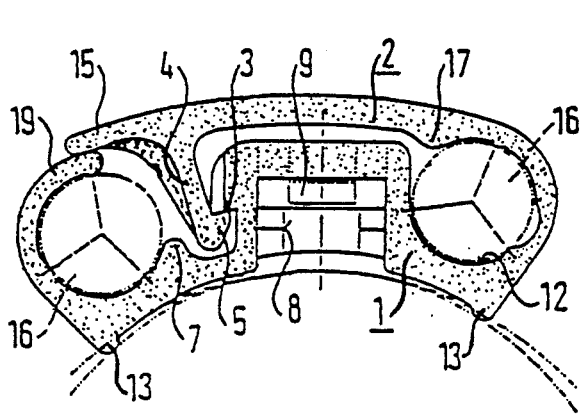

HOLDER FOR ELONGATE ARTICLES

BACKGROUND OF THE INVENTION

The present invention relates to a holder for elongate articles, in particular for Bowden cables on a bicycle frame which can be placed onto a T-bolt which projects relative to a component and on which it is secured both axially and radially against escape by means of an escape preventing means, and which has at least one elongate recess for receiving an article.

An arrangement is known for laying Bowden cables on a bicycle frame, in which T-bolts are welded onto the frame by the known stud welding method and plastic clips are pushed thereon. The generic plastic clips are secured against radial and axial escape and have two laterally longitudinally extending recesses, which are constructed such that Bowden cables of a certain diameter can be pressed into the recesses. However, it has been found that the Bowden cables easily jump out of the recesses and so it is usual to secure Bowden cables with straps on the frame in addition to the known arrangement. Furthermore, with the known plastic clips, the unaesthetically designed means for pushing onto the T-bolts are visible, so the overall arrangement does not give a very attractive impression.

It is also known, for laying Bowden cables on a bicycle frame, to braze eyelets of metal onto the bicycle frame. These brazed eyelets are on the one hand expensive to produce and also have the disadvantage that the Bowden cables have to be threaded into the brazed eyelets.

It is an object of the present invention to provide a holder for elongate articles which both guarantees a secure mounting for the articles and also has an attractive appearance.

BRIEF DESCRIPTION OF THE INVENTION

According to the present invention, a holder for elongate articles, in particular for Bowden cables on a bicycle, which can be placed onto a T-bolt which projects relative to a component and on which it is secured both axially and radially against escape by means of an escape preventing means, and which has at least one elongate recess for receiving an article is provided with a flap which is articulated longitudinally laterally and, for holding the article by means of the recess and the escape preventing means is pivoted and is held on the holder by means of a releasably catching mechanism.

The holder according to the invention is advantageous in many respects. On the one hand, the elongate articles are held securely. The laterally articulated flap is pivoted over the recess for receiving the elongate articles and is held by a releasable catching mechanism. The holder is suitable, in particular, for accommodating Bowden cables which are to be guided on a bicycle frame. When the Bowden cables are being installed, they do not have to be threaded into brazed eyelets but can be laid in, whereupon the flap is pivoted and caught. The appearance which has recently become important in bicycles is advantageously achieved as the flap is pivoted not only over the mechanism for preventing escape from the T-bolt. The conditions of a clear attractive design are therefore satisfied.

It is also advantageous that the holder according to the invention can have a flat construction, and this also contributes to an attractive appearance.

The holder is preferably produced from plastics material integrally with the flap and the flap is articulated to the holder via a so-called film hinge. If an elastic plastics material is used, this has the advantage that the holder can receive elongate articles having different diameters without impairing functionality. A holder of plastics material can be produced in a simple injection moulding tool without moving inserts while using little material.

For use in the mounting of Bowden cables on a bicycle, it is obviously preferable to use a plastics material having good UV-resistance.

The releasable catching mechanism is preferably constructed such that a longitudinalon web is provided on the side of the flap facing the holder which engages behind a longitudinal shoulder provided on the holder. A longitudinal bead which prevents unintentional opening of the flap can be arranged in the vicinity of the longitudinal shoulder. The longitudinal bead is generally sufficiently elastic to prevent unintentional opening of the flap but to allow intentional opening of the flap in order to be able to exchange the articles held by the arrangement. The holder preferably has, above the longitudinal shoulder, a bevel over which the catch nose of the flap slides during the closure process, allowing easy closure of the flap.

The mechanism for preventing axial as well as radial escape is preferably such that a longitudinally extending U-shaped cavity is constructed centrally in the holder which engages behind the head of the T-bolt, and above the opening of the U-shaped cavity an elastic tongue is arranged which acts laterally on the head of the T-bolt. Such a method of preventing radial and axial escape from a T-bolt is known, for example, from German Gebrauchsmuster Application G87 08 580.1.

According to a further preferred embodiment of the present invention, the underside of the holder is concavely curved transversely to the longitudinal direction. If the holder is placed on a tubular component (example bicycle frame), this has the advantage that the holder has its desired orientation directly after application. Longitudinally orientated external ribs can be provided on the underside of the holder so that the holder is suitable for application to different frame tube diameters.

The concave design of the underside of the holder has the advantage, when the holder is placed on a plane component, that the catching mechanism can effectively be released by external pressure on the closed flap.

In one preferred embodiment of the invention, the holder is suitable for receiving an elongate article. The recess for receiving the article is preferably arranged in the region in which the flap is articulated on the holder. The flap has, at its non-articulated end, an extension which covers the longitudinal bead to secure the catching mechanism. The covering of the catching mechanism and of the longitudinal bead on the one hand has the advantage that unintentional access to the catching mechanism is impossible and, on the other hand, this contributes to a greatly improved appearance.

In other preferred embodiments, the holder is suitable for receiving, for example, two or three elongate articles. In these cases, the recesses are distributed on both sides of the mechanism for application to the T-bolt and the flap has, at its non-articulated end, a projection which covers a recess provided in the region of this end. In this case, the projection contributes not only to the appearance and to the coverage of the catching mechanism but also to the security of mounting of the elongate articles.

BRIEF DESCRIPTION OF THE DRAWINGS

In order that the invention should be better understood, three preferred embodiments will now be described in greater detail by way of example with reference to the accompanying in which:

FIG. 3 is a partial sectional view of the holder according to FIG. 1 along the section line I—I in FIG. 1;

FIG. 4 is a front view of the holder according to FIG. 1, shown on a bicycle frame with closed flap and laid-in article;

FIG. 7 is a partial sectional view of the holder according to FIG. 5 along the section line II—II in FIG. 5;

FIG. 8 is a front view of the holder according to FIG. 5, shown on a bicycle frame with closed flap and laid-in articles;

DETAILED DESCRIPTION OF THE DRAWINGS AND PREFERRED EMBODIMENTS

Figure 1:
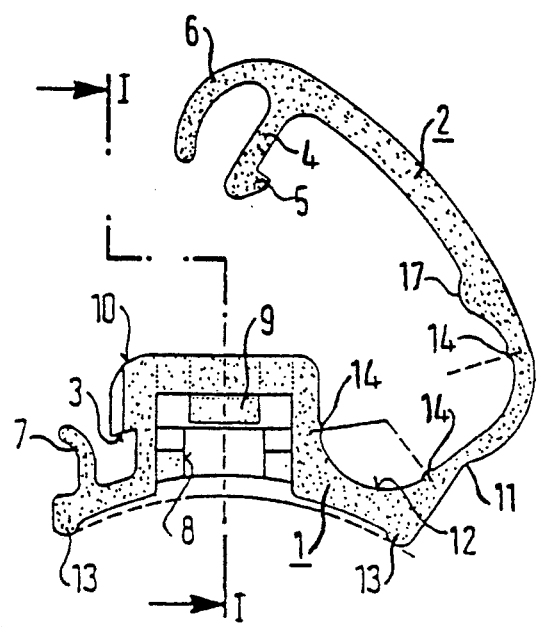
FIG. 1 is a front view of an embodiment of a holder for receiving an elongate article when the flap is open.

FIGS. 1 to 4 show different views of a holder according to the invention which is suitable for receiving an elongate article, preferably for mounting a Bowden cable on a bicycle frame. The T-bolt onto which the holder according to the invention is placed is shown in FIG. 3. FIG. 1 shows a front view of the holder 1 with open flap 2. The holder 1 has a central mechanism for securing the holder against axial and radial escape from the T-bolt, which is hereinafter called escape preventing means and will be described later on.

The holder 1 is constructed from plastics material (polyethylene) integrally with the flap 2, and the flap 2 is articulated to the holder 1 via a longitudinally extending film hinge 11. The holder 1 has, in the region of the film hinge 11, a longitudinally extending recess 12 for receiving a Bowden cable 16 (FIG. 4) which is arc-shaped in cross section.

The flap 2 is substantially semi-circular in cross section in the region of the film hinge 11 opposite the recess 12 and has a longitudinal projection 17 which is shaped such that the flap 2 forms an approximately circular receiver in the closed state with the recess 12 of the holder 1. Longitudinal noses 14 are distributed peripherally over the approximate circular cross section on the recess 12 and said circular region of the flap 2. The longitudinal noses allow secure mounting and a certain hold in the longitudinal direction for different Bowden cable diameters.

The holder 1 has, on the side of the escape preventing means remote from the recess 12, a downwardly pointing, slightly bevelled holding shoulder 3 which is allocated an opposing closure bead 7. The flap 2 has, at its non-articulated end, an inwardly pointing web 4 with a catching nose 5 which engages behind the holding shoulder 3 in the closed state (FIG. 4).

When the flap 2 is closed, the end of the web 4 initially strikes a longitudinally extending slide bevel 10 which is located above the holding shoulder 3 and along which the web 4 slides until the catching nose 5 has caught on the holding shoulder 3. The closure bead 7, in the caught state, lies on the rear of the web 4 (FIG. 4) and prevents unintentional opening of the flap 2. The closure bead 7 is elastically constructed in this embodiment and thus allows release of the caught position between catching nose 5 and holding shoulder 3. The flap 2 has, at its non-articulated end, an arc-shaped extension 6 which covers the closure bead 7 and the web 4 in the closed state of the flap 2.

The underside of the holder 1 is shaped concavely transversely to the longitudinal direction and has longitudinally orientated supporting ribs 13 on the external sides. The radius of the concave curvature corresponds substantially to the radius of the bicycle frame tube on which the holder is to be arranged. Owing to the supporting ribs, with which the holder 1 usually rests on the bicycle frame tube, the holder can be placed on different frame diameters without impairing functionality.

Figure 2:
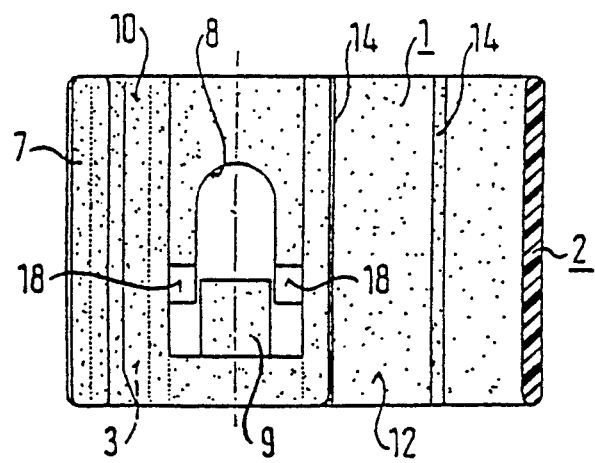
FIG. 2 is a plan view of the holder according to FIG. 1, in which the flap is cut away.
Figure 5:
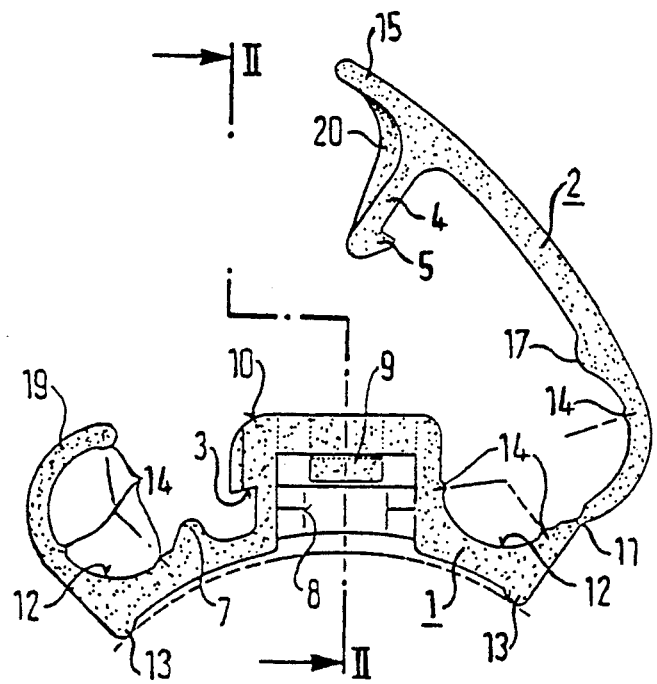
FIG. 5 is a front view of an embodiment of a holder for receiving two elongate articles with the flap open.
Figure 6:
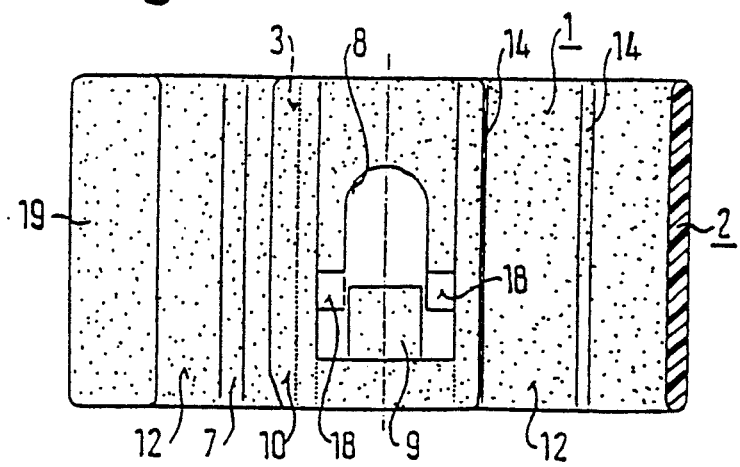
FIG. 6 is a plan view of the holder according to FIG. 5 in which the flap is cut away.
Figure 9:
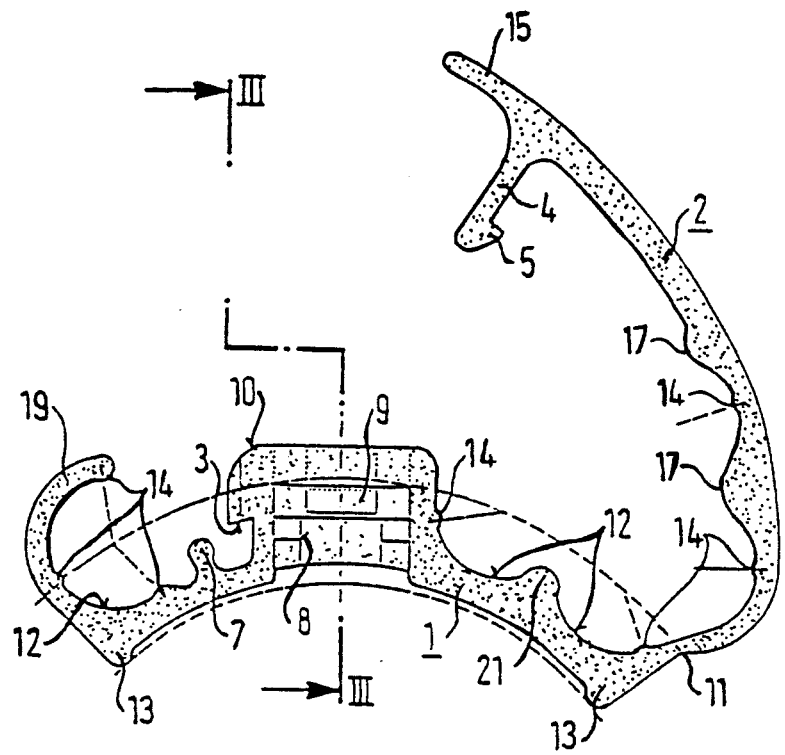
FIG. 9 is a front view of an embodiment of a holder for receiving three elongate articles with open flap.
Figure 10:
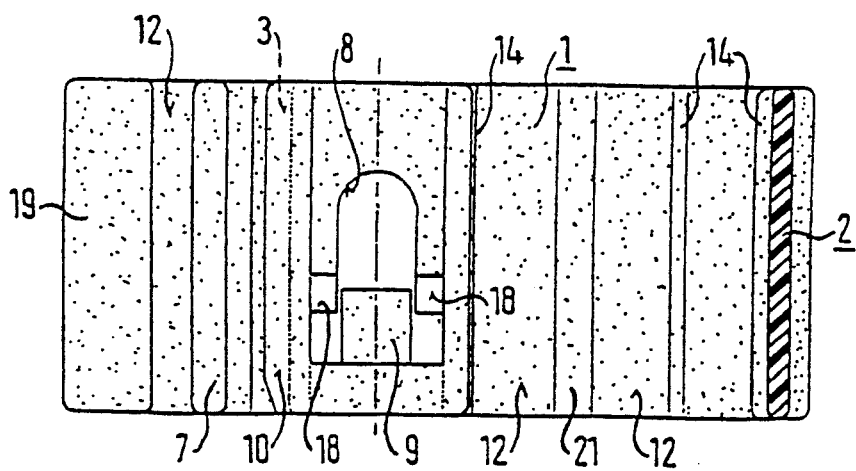
FIG. 10 is a plan view of the holder according to FIG. 9 in which the flap is cut away.
Figure 11:
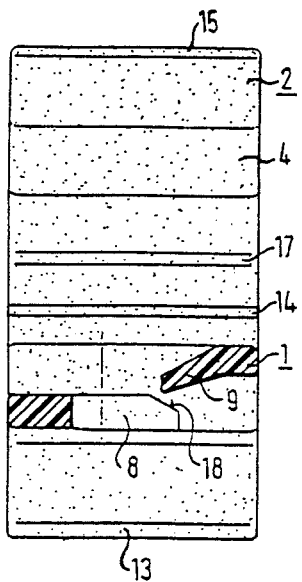
FIG. 11 is a partial sectional view of the holder according to 9 along the section line III—III in FIG. 9.
Figure 12:
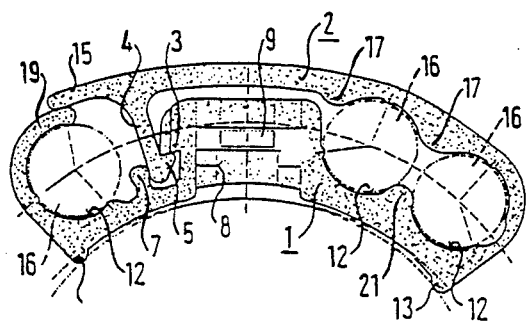
FIG. 12 is a front view of the holder according to FIG. 9 shown on a bicycle frame with closed flap and laid-in articles.

The mechanism for securing the holder 1 against both axial and radial escape from the T-bolt, escape preventing means, is described hereinafter with reference to FIGS. 2 and 3, FIG. 2 showing a plan view of the holder 1 and FIG. 3 a partial sectional view of the holder 1 along the line I—I in FIG. 1.

In FIG. 2, a longitudinally extending U-shaped cavity 8 of which the width corresponds to the neck of the T-bolt is constructed centrally in the holder 1. The upper side of the U-shaped cavity 8 is constructed toward the opening with two bevels 18 which allow easy application of the holder 1 onto the T-bolt. Above the U-shaped cavity 8, the holder 1 has an obliquely downwardly pointing tongue 9 of which the end lies substantially in the region of the bevels 18. When the holder 1 is pushed onto the T-bolt, the tongue 9 is pressed upwardly by the head of the T-bolt. When the holder 1 has been pushed completely onto the T-bolt, that is to the valley of the U-shaped cavity 8, the tongue 9 snaps downwardly and, in its released condition, acts laterally on the head of the T-bolt which is therefore secured against radial escape. The head of the T-bolt must have a greater diameter than the width of the U-shaped cavity 8.

FIGS. 5 to 8 show a further embodiment of a holder 1 according to the invention which is suitable for receiving two Bowden cables. The reference numerals in FIGS. 5 to 8 correspond to those in FIGS. 1 to 4—where identical or equivalent parts are concerned.

The design of the mechanism for preventing radial and axial escape from the T-bolt by means of the tongue 9 and the U-shaped cavity 8 is identical to that in FIGS. 1 to 4 so a description thereof is not required.

In this embodiment also, both the holder 1 and the flap 2 is integrally from plastics material and the flap 2 is articulated on the holder 1 via a film hinge. The design of the holder 1 and of the flap 2 in the region of the film hinge 11 corresponds to the design of the holder 1 in FIG. 1 and is suitable for receiving a Bowden cable.

The second Bowden cable is held by the holder on the other side of the escape preventing means and the construction of the holder 1 in this region differs from that of the first embodiment. On this side of the escape preventing means, a recess 12 for receiving a Bowden cable passes into an elastic holding web 19 extending in the form of an arc and pointing substantially to the slide bevel 10, with which holding web 19 the recess 12 almost surrounds three-quarters of a circle. Inside the periphery of this "virtual" circle there are distributed both on the holding web 19 and on the recess 12 longitudinal noses 14 of which the function corresponds to that of the first embodiment. The holding web 19 has to be elastic as it has to hold the laid-in Bowden cable on the one hand but it is also to allow the Bowden cable to be laid in on the other hand.

The recess 12 passes without attachment into a closure bead 7 toward the escape preventing means.

The flap 2 has, at its end, an inwardly pointing web 4 with a catching nose 5 which, in the closed state, engages behind a holding shoulder 3 on the holder 1. Above the holding shoulder 3, the holder is in turn provided with a longitudinally extending slide bevel 10 which simplifies closure of the flap 2. The closure bead 7 is arranged opposite the holding shoulder 3 and prevents unintentional opening of the caught position between catching nose 5 and holding shoulder 3 in the closed state. In contrast to the first embodiment, the closure bead 7 does not lie on the web 4 in the closed state but is at a distance from it corresponding substantially to the length of the catching nose 5.

The flap 2 also has, at its end remote from the film hinge 11, an outwardly pointing projection 15 which is placed over the end of the holding web 19 to the closed state (FIG. 8) and therefore prevents unintentional bending of the holding web 19. A transverse rib 20 is provided for reinforcement between projection 15 and web 4, which are at a right angle to one another (FIG. 7).

FIGS. 9 to 12 show a third embodiment of a holder according to the invention which is suitable for receiving three Bowden cables.

The escape preventing means with U-shaped cavity 8 and tongue 9 corresponds to that of the first two embodiments. The design of the holder on the side of the catching mechanism substantially corresponds to the second embodiment with the difference that the closure bead 7 does not pass directly into the recess 12 and does not therefore contribute to the support of the Bowden cable on this side but is longitudinally constricted in the attachment so that it receives a certain elasticity in the transverse direction. In this third embodiment in the closed state of the flap, the closure bead 7 rests on the web 4 (FIG. 12) and thus prevents unintentional opening of the flap 2. During inventional opening of the flap 2, the closure bead 7 can be pressed transversely outwardly in order to release the catching nose 5 of the web 4 from the holding shoulder 3 of the holder.

On the side of the holder in the region of the film hinge 11 the holder 1 has two recesses 12 for receiving a respective Bowden cable. A longitudinal hump 21 is formed between the recesses 12. The flap 2 is provided, in said region, with two inward longitudinal attachments 17 of which one opposes the hump 21 in the closed state. The flap is semi-circular in cross-section between the film hinge 11 and the longitudinal attachment 17 opposing the hump 21 on the one hand and between this one and the second longitudinal attachment 17 on the other hand and therefore forms, together with the opposing recesses 12, receivers which are almost circular in cross-section for a respective Bowden cable. Longitudinal noses 14 which—as already described above—allow the reception of Bowden cables of different diameters and point into the centre of the "virtual" circular receivers are provided both in the circular bays of the flap 2 and the recesses 12.

The three embodiments for receiving 1, 2 or 3 Bowden cables are similar in external appearance. Holders of all three embodiments can therefore be arranged on a bicycle without producing an irregular appearance.

The holders of all three embodiments are suitable for different Bowden cable diameters. Bowden cables from different producers and having different functions (brake; change gear) can therefore be received. The holders of all three embodiments are suitable for application on different bicycle frame tube diameters and can therefore be arranged both on the main frame, on the rear wheel link, optionally also on the fork.

Standard bolts which are distributed in bulk—not only for the bicycle industry—and are therefore correspondingly inexpensive—can be used as T-bolts.

I claim:

1. A holder for attachment to a T-bolt extending from a structure and for holding elongated articles comprising:
    a body shaped to lie against the structure;
    a slot in said body, said slot being closed at one end and open at the other end, said slot having a narrow portion for receiving the shaft of a T-bolt and a wide portion for receiving the head of a T-bolt;
    a flexible tongue on said body having a free end portion of said slot for retaining the head of a T-bolt between said tongue and said closed end;
    a shoulder on said body;
    a covering flap extending over said body, said flap and said body being shaped to define at least one recess for enclosing an elongated article therein; and
    flexible interlocking means on said flap for engaging said shoulder to retain said flap on said body.

2. A holder according to claim 1, characterized in that said body is formed form plastic material in one piece with said flap, and said flap is connected to said body via a film hinge.

3. A holder according to claim 2, characterized in that a web is formed on the side of said flap facing said body, said web having a catching nose, and a holding shoulder is provided on said body, said nose and said shoulder cooperating to hold said flap closed over said body.

4. A holder according to claim 3, characterized in that a closure bead is provided on said body adjacent said holding shoulder which prevents unintentional opening of the flap.

5. A holder according to claim 1, characterized in that said shape of said body is concave to lie against a tubular structure.

6. A holder according to claim 5, wherein longitudinally oriented supporting ribs are provided on said concave shape.

7. A holder according to claim 2, characterized in that said recess is provided in the region of said film hinge and an extension is provided at the free ned of said flap which covers said interlocking means, said slot and said tongue.

8. A holder according to claim 1, characterized in that a plurality of said recesses are provided for receiving a plurality of elongate articles, at least one of said recesses being located on each side of said slot; said flap extending across said body to cover said recesses.

9. A holder for attachment to a T-bolt extending from a structure and for holding elongated articles comprising:

a body shape to lie against the structure;

a T-shaped slot formed in said body for engagement with a T-bolt;

means on said body for retaining a T-bolt in said slot;

a cover flap extending across said body and covering said slot and said retaining means, said cover flap being connected to said body via a plastic hinge;

said cover flap and said body jointly defining an elongated recess for receiving an elongated article therein, said recess being adjacent said hinge;

the free end of said cover flap and the opposite side of said body having cooperating detent means for effecting closure of said cover flap over said recess; and said body having an elongated closure bead adjacent said detent means to prevent inadvertent release thereof.

* * * * *